US008745681B2

(12) United States Patent
Babu et al.

(10) Patent No.: US 8,745,681 B2
(45) Date of Patent: Jun. 3, 2014

(54) SET TOP BOX RESOURCE ALLOCATION FOR EXECUTING A WIDGET

(75) Inventors: Narendra B. Babu, Chennai (IN); Sampath X. Raman, Tirunelveli (IN); Chinmay R. Apte, Pune (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 201 days.

(21) Appl. No.: 13/276,534

(22) Filed: Oct. 19, 2011

(65) Prior Publication Data

US 2013/0104178 A1   Apr. 25, 2013

(51) Int. Cl.
*H04N 7/173* (2011.01)

(52) U.S. Cl.
USPC .......... 725/107; 725/25; 725/87; 725/91; 725/114; 718/104

(58) Field of Classification Search
None
See application file for complete search history.

(56) References Cited

U.S. PATENT DOCUMENTS

| 7,403,887 | B1 * | 7/2008 | Bishop et al. | 703/26 |
| 7,562,243 | B1 * | 7/2009 | Ghose | 713/324 |
| 2008/0282253 | A1 * | 11/2008 | Huizenga | 718/104 |
| 2009/0183218 | A1 * | 7/2009 | Li et al. | 725/114 |
| 2010/0299695 | A1 * | 11/2010 | Watson et al. | 725/25 |

* cited by examiner

*Primary Examiner* — Joshua Taylor

(57) ABSTRACT

A system is configured to receive a request to establish a session with a set top box device executing an application; obtaining a profile that identifies usage patterns of resources associated with the device; obtain another profile that identifies a first quantity of the resources to be used by the application; identify a second quantity of the resources to be allocated for executing the application based on the profile and other profile; receive information that identifies a third quantity of the resources used, by the application, during the session; transmit a notification indicating that a condition is associated with the application when the third quantity of the resources is greater than the second quantity of the resources; and transmit another notification indicating that a condition is not associated with the application when the third quantity of the resources is not greater than the second quantity of the resources.

23 Claims, 8 Drawing Sheets

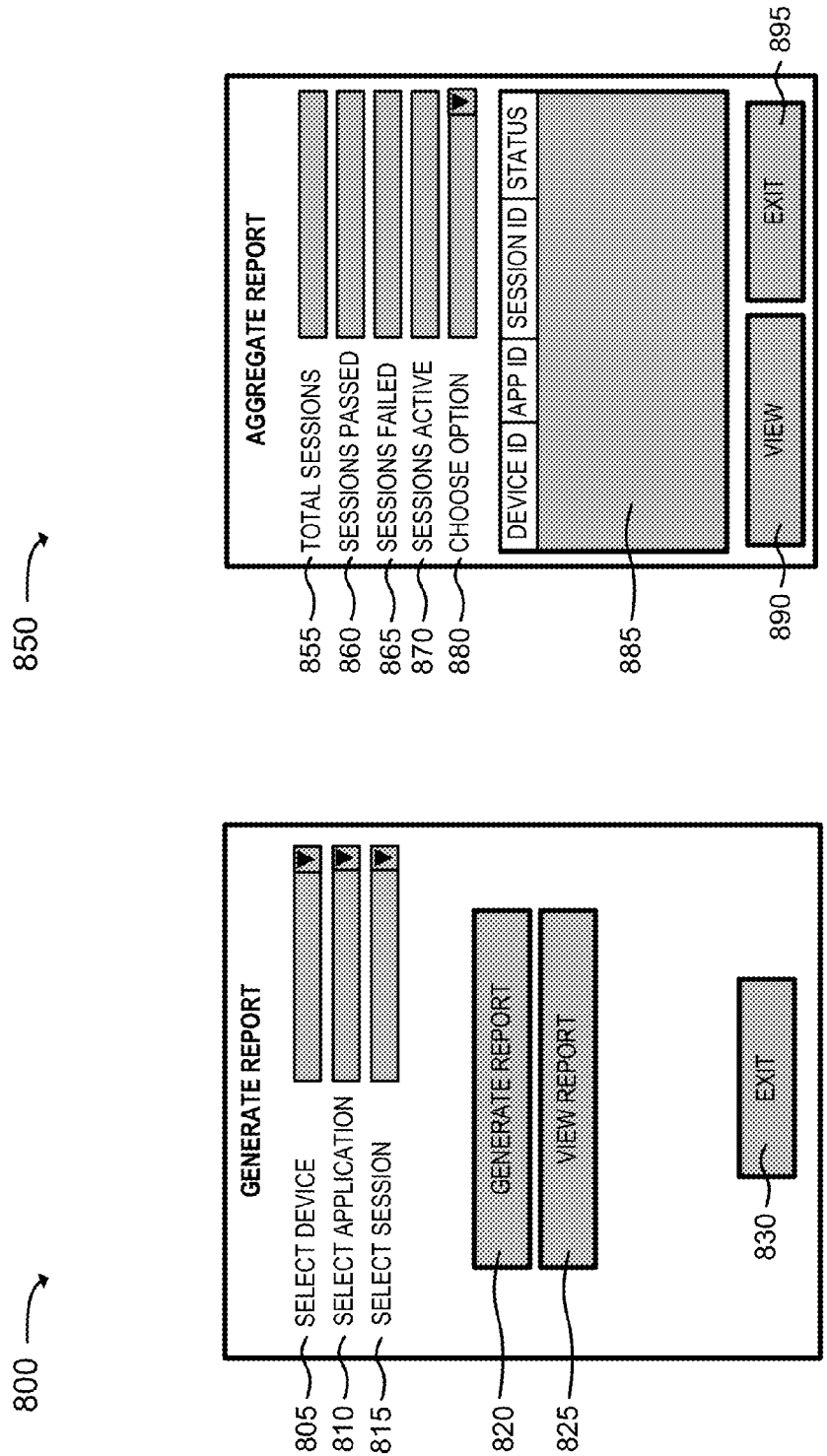

SET TOP BOX RESOURCE ALLOCATION FOR EXECUTING A WIDGET

BACKGROUND

Users of set top boxes may download, from a television network, a growing variety of applications (e.g., sometimes referred to as widgets) that can be executed on the set top boxes. The widgets may be run on the set top boxes to improve a user experience by allowing the users to interact with and/or use the set top boxes in a variety of ways, such as for social networking, to access content from the Internet (e.g., movies, sports, news, etc.), to download games, etc.

The widgets may use resources, associated with the set top boxes, when the widgets are being executed by the set top boxes. When widgets are being executed, the set top boxes may allocate a portion of available processing capacity, memory, network bandwidth, etc. to the widgets. If, however, the set top boxes do not allocate enough resources to the widgets, the widgets may not execute properly, which may degrade the user experience. Additionally, if widgets are not developed in a manner that adequately accounts for a resource capacity of the set top boxes, then widgets may not properly execute on the set top boxes.

BRIEF DESCRIPTION OF THE DRAWINGS

FIGS. 8A and 8B are diagrams of example user interfaces that allow the user to request or obtain usage reports, associated with a set top box, according to an implementation described herein.

DETAILED DESCRIPTION OF PREFERRED EMBODIMENTS

The following detailed description refers to the accompanying drawings. The same reference numbers in different drawings may identify the same or similar elements.

A system and/or method, described herein, may allow a user device to monitor and/or control resource usage, associated with a set top box, while the set top box is executing an application (hereinafter referred to as a "widget") that has been downloaded to the set top box. The system and/or method may allow a user, of the user device, to set up a resource profile, associated with the set top box, that identifies a manner in which processing capacity, memory, network communications, bandwidth utilization, and/or other resources are to be allocated when the set top box operates and/or executes one or more widgets.

The system and/or method may allow the user device to obtain a usage profile, associated with a widget, that identifies minimum resources that are expected to be used, by the widget, to allow the widget to run properly on the set top box. The system and/or method may allow the user device to generate a resource usage configuration, associated with the set top box, that allocates resources, for executing the widget, based on the resource profile and/or the usage profile. The system and/or method may allow the user device to identify whether a condition, is associated with the widget, based on whether a manner in which resources used by the widget, when being executed by the set top box, conform to the resource usage configuration and/or resource profile associated with the set top box. The system and/or method may allow a widget to be developed and/or modified to conform to a resource profile and/or a usage resource configuration associated with a set top box.

Figure 1:
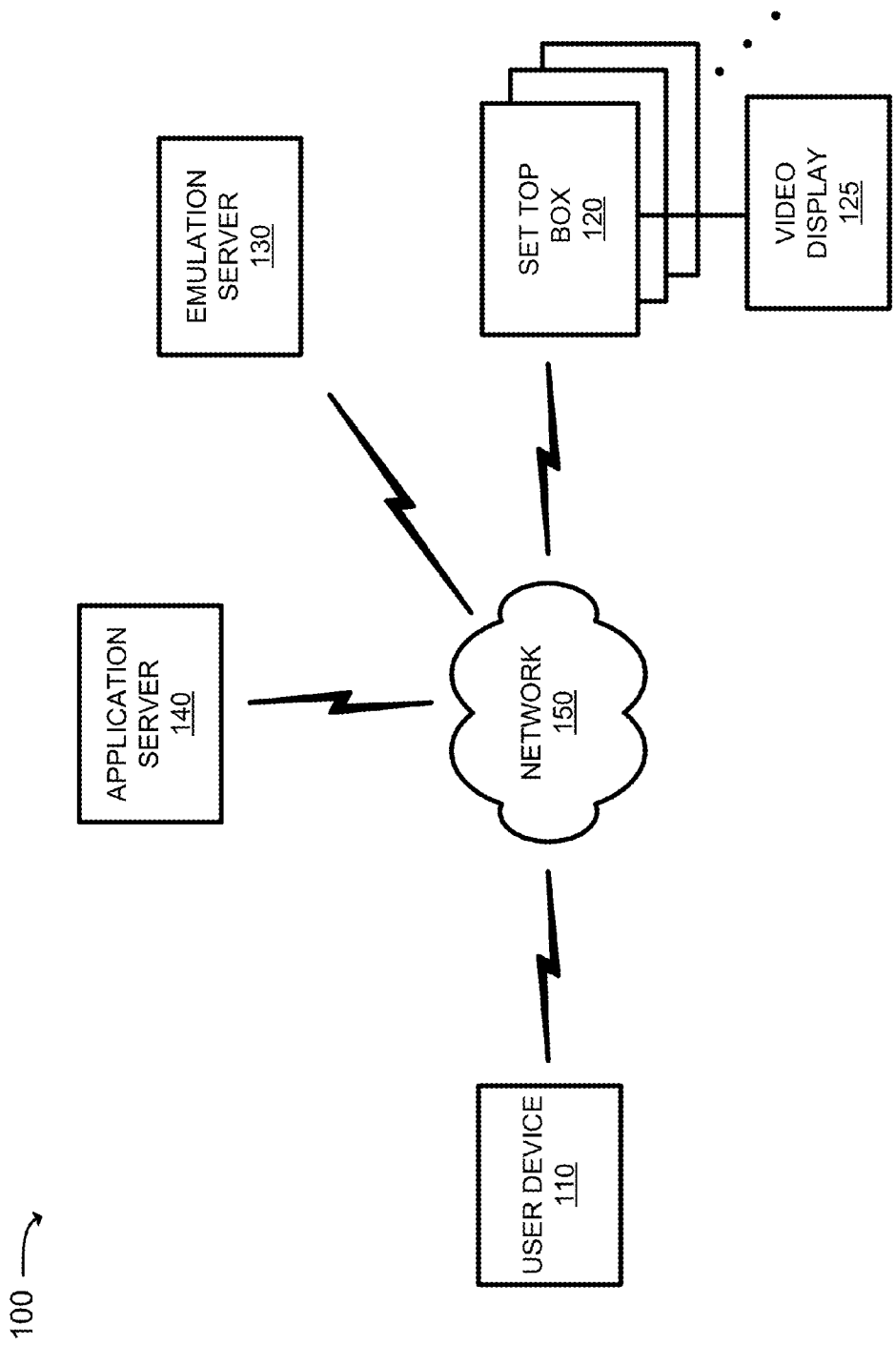
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a user device 110, a set top box 120 (hereinafter referred to as "STB 120"), a video display 125, an emulation server 130, an application server 140, and a network 150. The number of devices and/or networks, illustrated in FIG. 1, is provided for explanatory purposes only. In practice, there may be additional devices and/or networks, fewer devices and/or networks, different devices and/or networks, or differently arranged devices and/or networks than illustrated in FIG. 1.

Also, in some implementations, one or more of the devices of environment 100 may perform one or more functions described as being performed by another one or more of the devices of environment 100. For example, STB 120 and video display 125 may be combined into a single device. Devices of environment 100 may interconnect via wired connections, wireless connections, or a combination of wired and wireless connections.

User device 110 may include any computation or communication device, such as a wireless mobile communication device that is capable of communicating with network 150. For example, user device 110 may include a desktop computer, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a tablet computer, a camera, a personal gaming system, a smart phone, or another type of computation or communication device.

User device 110 may host an application that allows a user, of user device 110, to monitor and/or control resource usage, associated with STB 120, when a widget is being executed by STB 120. The term user, as described herein, may correspond to an operator and/or system administrator associated with a service provider that provides content (e.g., video content, widgets, games, etc.) to STB 120. Additionally, or alternatively, the user may correspond to a vendor and/or a developer of a widget to be executed on STB 120. User device 110 may allow the user to set up a resource profile associated with STB 120. The resource profile may identify resources associated with STB 120 and/or a manner in which the resources are used when STB 120 is operating (e.g., playing video content, communicating with network 150, executing one or more widgets, etc.). The resource profile may be based on historical usage patterns associated with STB 120 and/or settings specified by the user.

User device 110 may communicate with STB 120 to obtain a usage profile associated with a widget that identifies resources to be used, by the widget, when running on STB 120. User device 110 may generate a resource usage configuration, associated with STB 120, that identifies how STB 120 is to allocate resources when executing the widget. User device 110 may determine whether a condition is associated with the widget based on whether the usage profile conforms to the resource usage configuration and/or whether actual resources, being used by the widget when running on STB 120, conform to the resource usage configuration.

STB 120 may include a device that can communicate with network 150 to receive and/or process video content. In an example implementation, STB 120 may include a set top box, a digital video recorder, a cable card, or another type of device that includes a video tuner.

STB 120 may download, from application server 140, a widget that, when executed by STB 120, allows a user, of STB 120, to interact with and/or use STB 120 to perform a variety of operations associated with social networking, obtaining content from the Internet (e.g., movies, sports, news, etc.), playing games, etc. STB 120 may communicate with user device 110, via network 150, and may transmit a usage profile, associated with the widget, to user device 110 based on the communication. The usage profile may identify a quantity of resources that are actually used and/or expected to be used, by the widget, when executing on STB 120. STB 120 may receive, from user device 110, a resource usage configuration that identifies a manner in which resources, associated with STB 120, are to be allocated for executing the widget. STB 120 may use the resource usage configuration to allocate resources to the widget, when executing the widget on STB 120.

Video display 125 may include one or more devices capable of receiving, processing and/or displaying video and/or audio signals, associated with video content, received from STB 120. In one example implementation, video display 125 may take the form of a television. In another implementation, video display 125 may include a computer monitor.

Emulation server 130 may include one or more server devices, or other types of computation or communication devices, that gather, process, search, store, and/or provide information in a manner similar to that described herein. In an example implementation, emulation server 130 may host an application that models how STB 120 executes a widget. Emulation server 130 may allow a programmer (e.g., a user of user device 110 and/or an operator of emulation server 130) to develop a widget and/or to test whether the widget conforms to a resource usage configuration associated with STB 120. For example, emulation server 130 may simulate a manner in which resources, associated with STB 120, are allocated and/or used when STB 120 executes a widget. Emulation server 130 may communicate with user device 110 to receive a resource usage configuration, associated with STB 120, and may allocate resources, to the widget, when executing the widget. Emulation server 130 may output, to user device 110, usage information that identifies a quantity of resources that were allocated to the widget when the widget was executed. Outputting the usage information may allow user device 110 to determine whether resources, used by the widget, conform to the resource usage configuration. Additionally, or alternatively, emulation server 130 may output usage information that indicates whether the widget runs properly when resources, used by the widget, conform to the resource usage configuration.

In the description below, widgets are described as being executed by STB 120 and/or sessions are described as being performed by STB 120. In another implementation, the widgets may be executed by emulation server 130 and/or the sessions may be performed by emulation server 130. Thus, the examples below that describe the widgets being executed by STB 120 and the sessions being performed by STB 120 are provided for explanatory purposes.

Application server 140 may include one or more devices, or other types of computation or communication devices, that gather, process, search, store, and/or provide information in a manner similar to that described herein. In one example implementation, application server 140 may be a web server that stores one or more widgets and/or that permits the one or more widgets to be accessed and/or downloaded by STB 120. Application server 140 may transmit a widget, to STB 120 and/or emulation server 130, in response to a request and/or in exchange for payment from STB 120 and/or emulation server 130.

Network 150 may include a single network or multiple networks. For example, network 150 may include a video signaling and distribution network, such as a fiber optic-based network (e.g., a fiber optic service network), that distributes information and/or television content to STB 120. Additionally, or alternatively, network 150 may include one or more wired and/or wireless networks. For example, network 150 may include a cellular network, the Public Land Mobile Network (PLMN), and/or a second generation (2G) network, a third generation (3G) network, a fourth generation (4G) network, a fifth generation (5G) network, and/or another network (e.g., a long term evolution (LTE) network). Additionally, or alternatively, network 150 may include a wide area network (WAN), a metropolitan area network (MAN), an ad hoc network, an intranet, the Internet, and/or a combination of these or other types of networks.

Figure 2:
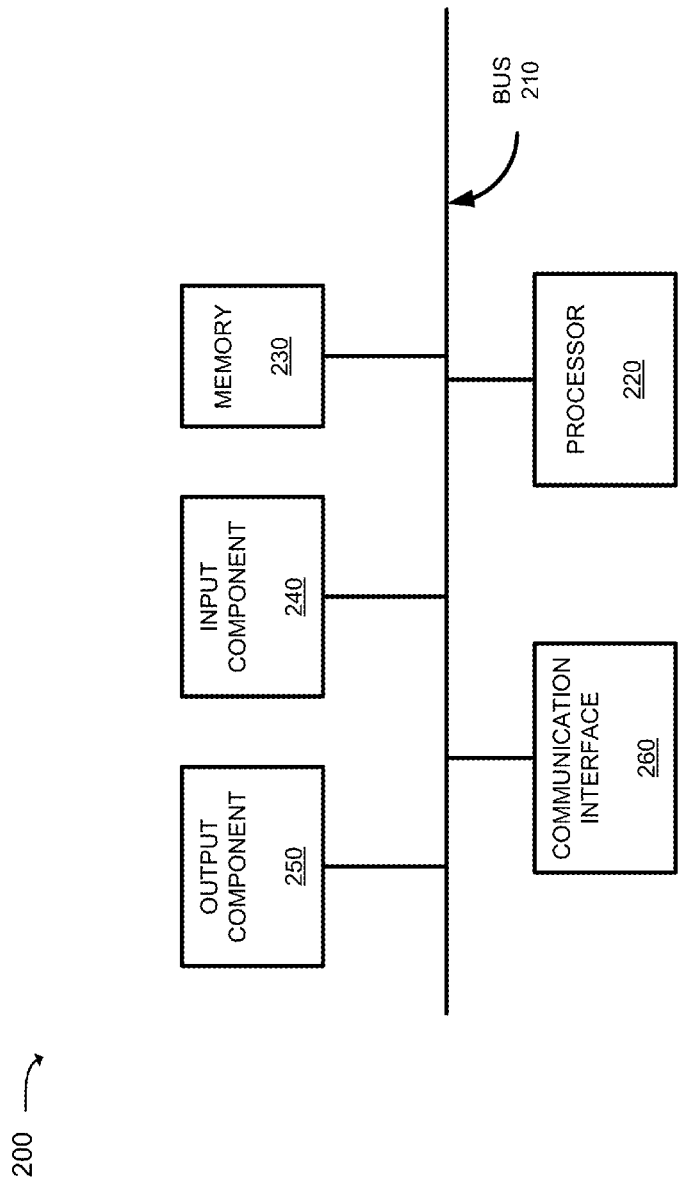
FIG. 2 is a diagram of example components of one or more of the devices depicted in FIG. 1.

FIG. 2 is a diagram of example components of a device 200 that may correspond to user device 110, STB 120, emulation server 130, and/or application server 140. Alternatively, each of user device 110, STB 120, emulation server 130, and/or application server 140 may include one or more devices 200. Device 200 may include a bus 210, a processor 220, a memory 230, an input component 240, an output component 250, and a communication interface 260. In another implementation, device 200 may include additional components, fewer components, different components, or differently arranged components than are shown in FIG. 2.

Bus 210 may include a path that permits communication among one or more of the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include a mechanism that permits a user to input information to device 200, such as a keyboard, a keypad, a pointing device, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems. For example, communication interface 260 may include an Ethernet interface, an optical interface, a coaxial interface, or the like.

As will be described in detail below, device 200 may perform certain operations relating to monitoring and/or controlling resource usage of a widget running on STB 120. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause to processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
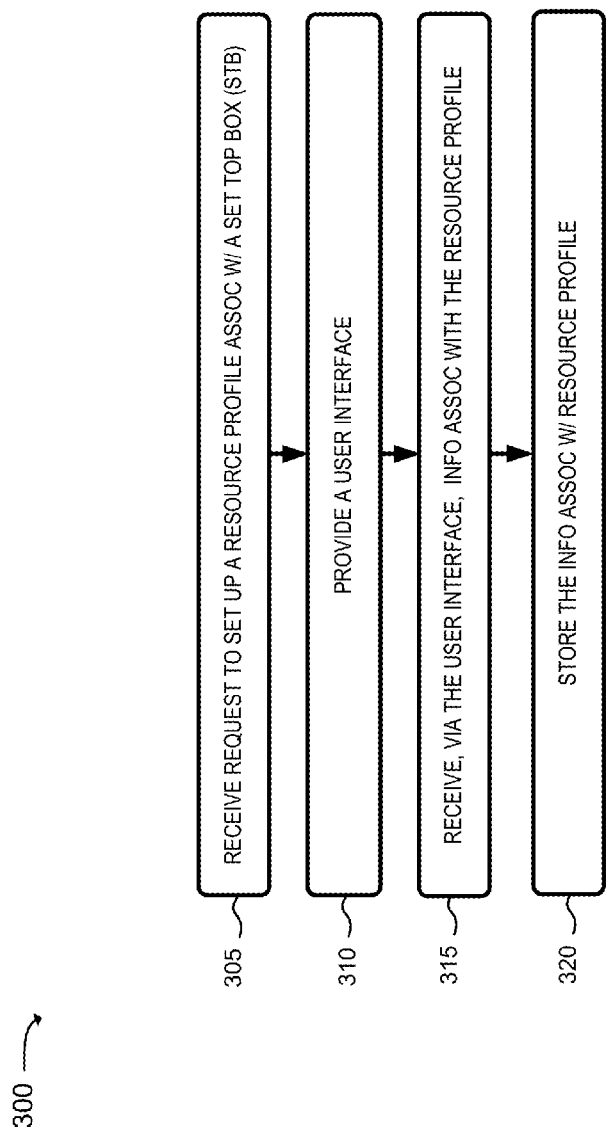
FIG. 3 is a flow chart of an example process for setting up a resource profile associated with a set top box according to an implementation described herein.
Figure 4:
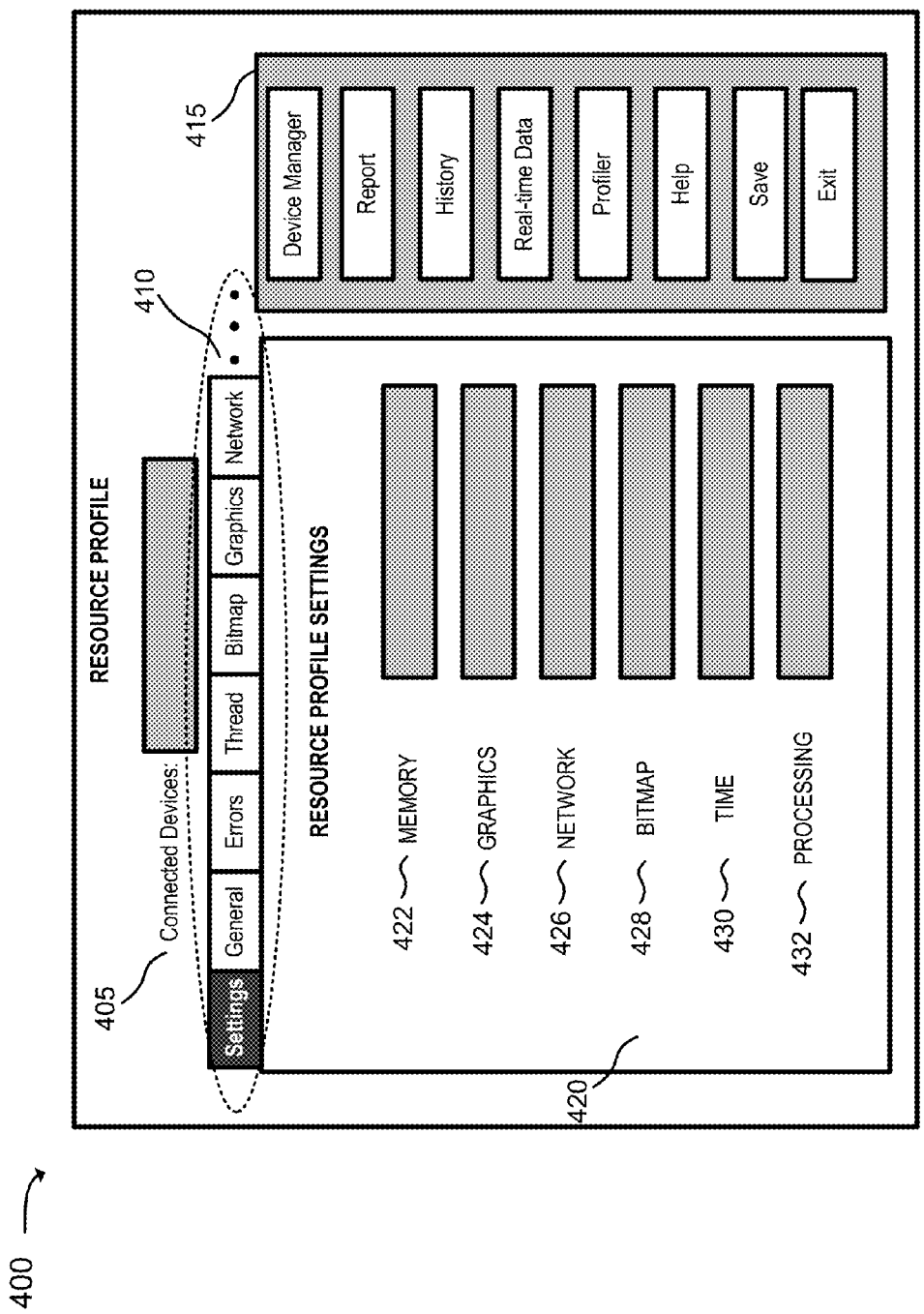
FIG. 4 is a diagram of an example user interface for setting up the resource profile or for managing a set top box according to an implementation described herein.

FIG. 3 is a flow chart of an example process 300 for setting up a resource profile associated with a set top box according to an implementation described herein. In one implementation, process 300 may be performed by user device 110. In another implementation, some or all of process 300 may be performed by a device or collection of devices separate from, or in combination with, user device 110. FIG. 4 is a diagram of an example user interface 400 for setting up the resource profile or for managing STB 120 and/or emulation server 130 according to an implementation described herein. In the description below, all or a portion of FIG. 3 will be described with references to user interface 400 of FIG. 4.

As shown in FIG. 3, process 300 may include receiving a request to set up a usage profile associated with a set top box (block 305) and providing a user interface in response to the request (block 310). For example, a user of user device 110 may desire to view and/or set up a usage profile associated with STB 120 and may request user device 110 to open an application that allows settings, associated with the usage profile, to be established. User device 110 may receive the request and may open an application that allows the usage profile to be specified. The application may cause user device 110 to present, for display, a user interface (e.g., user interface 400 of FIG. 4) via which the user may specify settings associated with the usage profile.

As illustrated in FIG. 4, user interface 400 may include a collection of data items, fields, and/or buttons, such as a connected devices field 405, a group of tab data items 410, a group of buttons 415, and/or a settings field 420. User interface 400 includes a quantity of data items, fields, and/or buttons for explanatory purposes. In another implementation, user interface 400 may include additional data items, fields, and/or buttons; fewer data items, fields, and/or buttons; different data items, fields, and/or buttons; and/or differently arranged data items, fields, and/or buttons than are described with respect to user interface 400.

Connected devices field 405 may identify a particular STB 120 to which user device 110 is connected for a particular session (e.g., when STB 120 executes a widget, plays video content, communicates with network 150, etc.). If user device 110 is not connected to a particular STB 120, then the user may use one or more of buttons 415 to establish a connection to the particular STB 120 in a manner described below. Tab data items 410 may include one or more tabs that identify resource usage information associated with the particular STB 120. The resource usage information may identify how resources, associated with the particular STB 120, are utilized during the particular session and/or have been utilized during a previous session. For example, a first tab data item 410 (e.g., labeled as "Settings") may, when selected by the user, cause a settings window 420 to open that allows the user to enter information associated with a resource profile for the particular STB 120. The resource profile may identify resource thresholds to be permitted for the particular STB 120 during current or future sessions. Settings window 420 will be described in greater detail below.

A second tab data item 410 (e.g., labeled as "General") may, when selected by the user, cause a window to open that identifies resources utilized, by the particular STB 120, during a current or previous session. The identified resources may include information associated with memory usage, processing capacity, bandwidth utilization, quantity of graphics windows, bitmap size, etc. utilized by STB 120 during the session. A third tab data item 410 (e.g., labeled as "Errors") may, when selected by the user, cause a window to open that identifies one or more errors associated with the session (e.g., a quantity of errors, type of errors, etc.). A fourth tab data item 410 (e.g., labeled as "Thread") may, when selected by the user, cause a window to open that identifies one or more threads and/or processes (e.g., a quantity of threads during the session, one or more types of threads, a quantity of concurrent threads, etc.) executed by STB 120 during the session.

A fifth tab data item 410 (e.g., labeled as "Bitmap") may include detailed information associated with bitmaps used during the session (e.g., a quantity of bits per bitmap, quantity of bitmaps in the session, type of bitmaps, peak size of bitmaps, etc.). A sixth tab data item 410 (e.g., labeled as "Graphics") may include detailed information associated with graphics used during the session (e.g., a quantity of graphics windows, a size of graphics windows, a type of graphics windows, peak size of graphics windows, etc.). A seventh tab data item 410 (e.g., labeled as "Network") may include detailed information associated with network communications used during the session (e.g., a quantity of network calls, a quantity of data associated with the network calls, peak quantity of network calls, etc.).

Buttons 415 may, when selected by the user, cause user device 110 to perform operations on STB 120 and/or on information obtained from STB 120. A first button 415 (e.g., labeled as "Device Manager") may, when selected by the user, cause a user interface to open (to be described in greater detail below with respect to the description associated with FIG. 7A) that allows the user to select the particular STB 120 with which to establish a connection. A second button 415 (e.g., labeled as "Report") may, when selected by the user, cause another user interface to open (to be described in greater detail below with respect to the description associated with FIG. 7B) that allows the user to generate one or more reports associated with a resource profile, a resource usage configuration, etc. associated the particular STB 120.

A third button 415 (e.g., labeled as "History") may, when selected by the user, cause user device 110 to present, via the one or more tab data items 410, resource usage information, for the particular STB 120, associated with a previous session. A fourth button 415 (e.g., labeled as "Realtime Data") may, when selected by the user, cause user device 110 to present, via the one or more tab data items 410, resource usage information, for the particular STB 120, associated with the current session. A fifth button 415 (e.g., labeled as "Profiler") may, when selected by the user, cause user device 110 to present previously entered resource usage information according to particular predetermined profiles. The predetermined profiles may allow the user to generate a resource profile based wholly, or in part, on a predetermined profile.

A sixth button 415 (e.g., labeled as "Help") may, when selected by the user, allow the user to obtain detailed information associated with one or more functions associated with the application (e.g., by selecting a function from an index, by entering a search query, etc.). A seventh button 415 (e.g., labeled as "Save") may, when selected by the user, cause user device 110 to save resource usage information, associated with a current session, in a memory associated with user device 110. Additionally, or alternatively, seventh button 415 may allow the user to save a resource profile, associated with the particular STB 120, that identifies a manner in which resources are to be allocated when the particular STB 120 performs an operation (e.g., executes a widget, plays video content, communicates with network 150, etc.). An eighth button 415 (e.g., labeled as "Exit") may, when selected by the user, cause user device 110 to close user interface 400 and/or end a current session. Settings field 420 may allow the user to enter settings associated with a resource profile for the particular STB 120.

Returning to FIG. 3, process 300 may include receiving, via the user interface, information associated with the resource profile (block 315) and storing the information associated with the resource profile (block 320). For example, the user may enter, via the user interface (e.g., via settings field 420 user interface 400 of FIG. 4) information associated with a resource profile for the particular STB 120. For example, the user may enter, via memory field 422, information that identifies memory resources, associated with the particular STB 120, to be allocated for executing a widget. The memory resources may identify a maximum quantity of memory blocks and/or a maximum quantity of memory space (e.g., bytes) to be allocated for executing a widget.

The user may enter, via graphics field 424, information that identifies graphics resources, associated with the particular STB 120, to be allocated for executing a widget. The graphics resources may identify a maximum quantity of graphics windows and/or a maximum amount of memory, for use by the graphics windows, that are permitted to be used for executing a widget. Additionally, or alternatively, the user may enter, via network field 426, information that identifies network resources, associated with the particular STB 120, to be allocated for executing a widget. The network resources may identify a maximum quantity of network calls and/or a maximum quantity of network data (e.g., received, transmitted, stored, etc.) permitted to be allocated for executing a widget.

The user may enter, via bitmap field 428, information that identifies bitmap resources, associated with the particular STB 120, to be allocated for executing a widget. The bitmap resources may identify a maximum quantity of bitmaps and/or a maximum size for each bitmap that is permitted to be allocated for executing a widget. Additionally, or alternatively, the user may enter, via time field 430, information that identifies time resources, associated with the particular STB 120, to be allocated for executing a widget. The time resources may identify a maximum quantity of timers and/or a maximum quantity of time (e.g., seconds, minutes, hours, etc.), associated with each timer, that is permitted to be allocated for executing a widget. Additionally, or alternatively, the user may enter, via processing field 432, information that identifies a portion of processing capacity, associated with the particular STB 120, to be allocated for executing a widget. The processing resources may identify a maximum portion of processing capacity (e.g., 10% 25%, 50%, 75%, etc.), associated with the particular STB 120, that is permitted to be allocated for executing a widget. User device 110 may receive the information, associated with the resource profile, via settings fields 420. User device 110 may store, in a memory associated with user device 110, the information associated with the resource profile when the user selects save button 415 associated with user interface 400 of FIG. 4.

Figure 5:
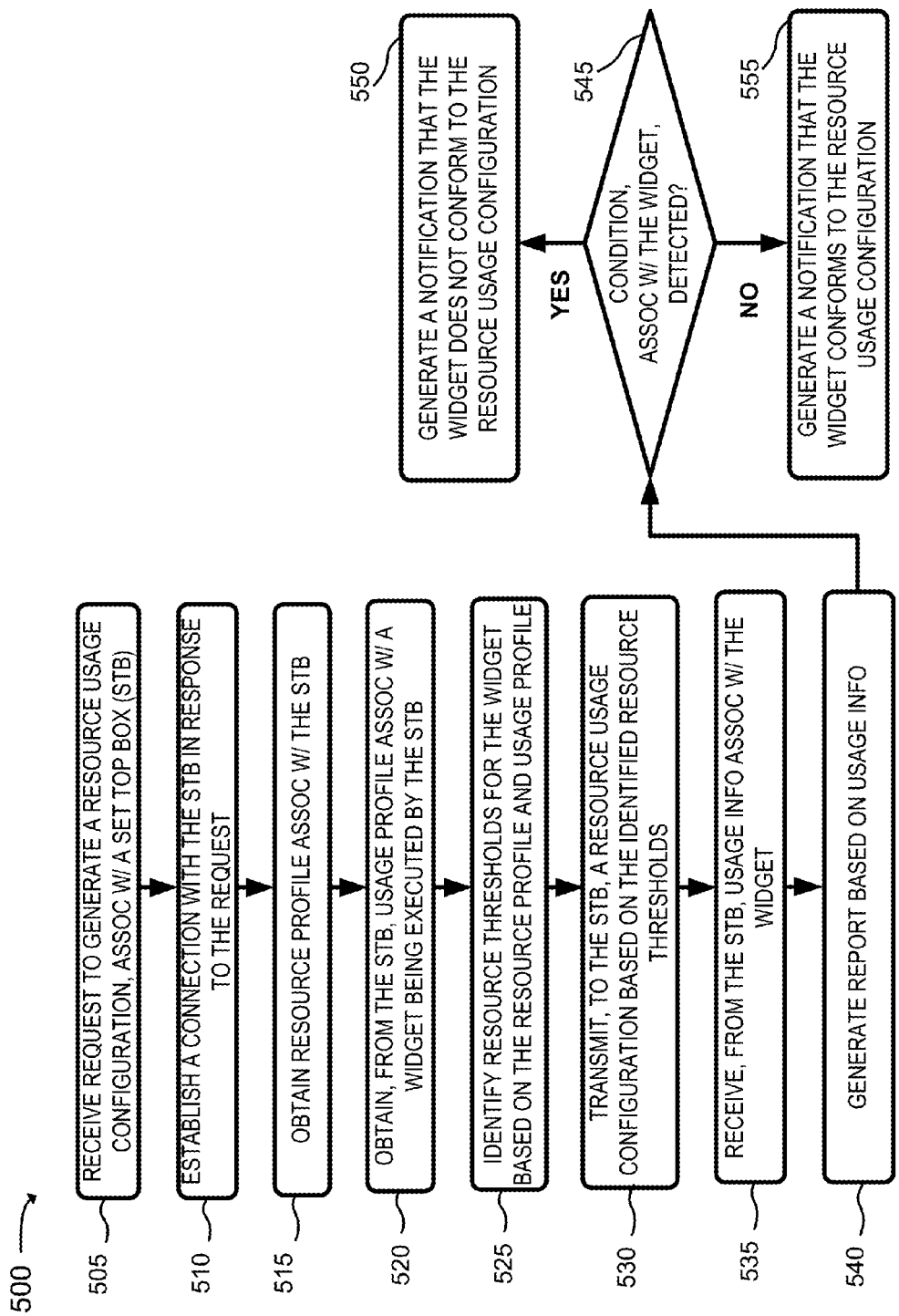
FIG. 5 is a flow chart of an example process for allocating resources to and/or monitoring resource usage by a set top box executing a widget, according to an implementation described herein.
Figure 6:
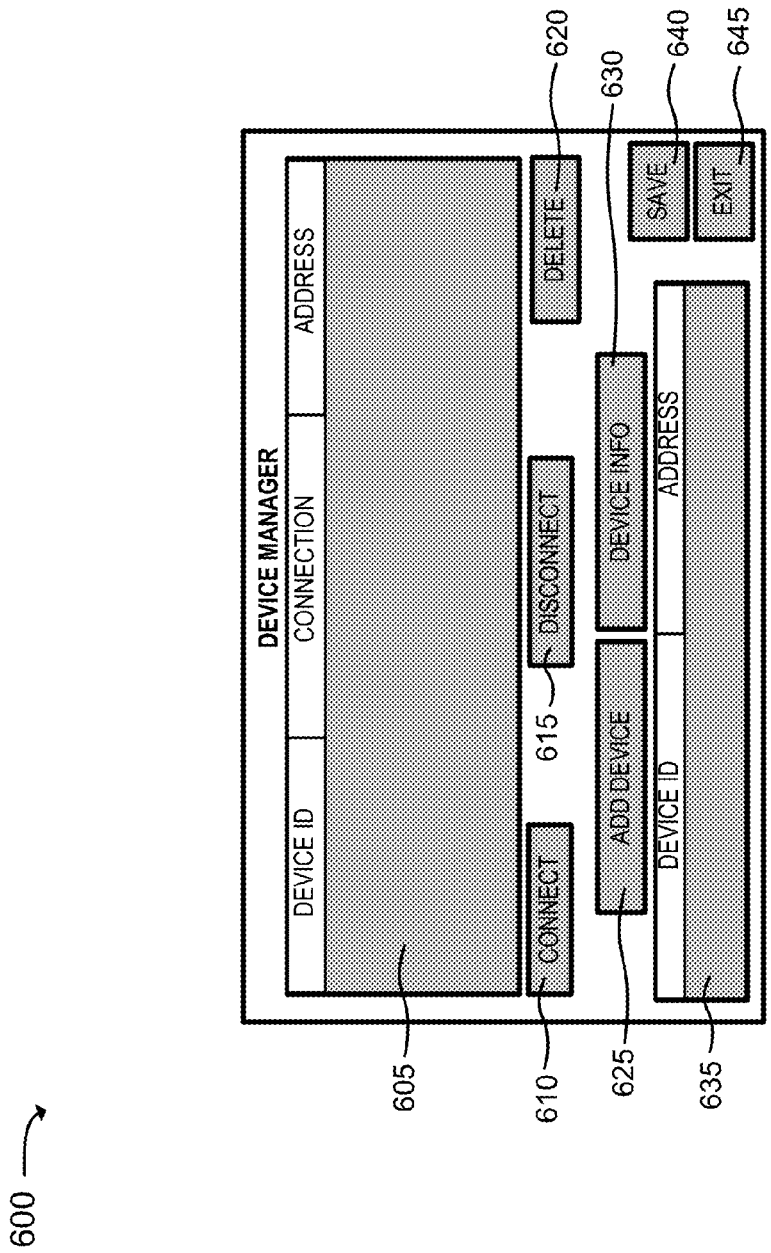
FIG. 6 is a diagram of an example user interface associated with managing a set top box, according to an implementation described herein.

FIG. 5 is a flow chart of an example process 500 for allocating resources to and/or monitoring resource usage by a set top box executing a widget, according to an implementation described herein. In one implementation, process 500 may be performed by user device 110. In another implementation, some or all of process 500 may be performed by a device or collection of devices separate from, or in combination with, user device 110. FIG. 6 is a diagram of an example user interface 600 for managing STB 120 according to an implementation described herein. In the description below, a portion of FIG. 5 will be described with references to user interface 600 of FIG. 6.

As shown in FIG. 5, process 500 may include receiving a request to generate a resource usage configuration associated with a set top box (block 505) and establishing a connection with the set top box in response to the request (block 510). For example, user device 110 may receive a request, from a user of user device 110, to generate a resource usage configuration for STB 120. The resource usage configuration may be used to test whether a widget can be certified to execute on STB 120. A certified widget may be permitted to be uploaded to application server 140 to be offered to other STBs 120. In one example, user device 110 may receive the request when the user selects a particular button 415 (e.g., device manager or some other button 415) associated with user interface 400 (FIG. 4). User device 110 may receive selection of the particular button 415 and may provide a user interface (e.g., user interface 600 of FIG. 6), for display on user device 110, that allows the user to select with which STB 120 to establish a connection.

As illustrated in FIG. 6, user interface 600 may include a collection of buttons and/or fields, such as a device field 605, a connect button 610, a disconnect button 615, a delete button 620, an add device button 625, a device information (info) button 630, a modification field 635, a save button 640, and an exit button 645. User interface 600 includes a quantity of fields and/or buttons for explanatory purposes. In another implementation, user interface 600 may include additional fields and/or buttons, fewer fields and/or buttons, different fields and/or buttons, and/or differently arranged fields and/or buttons than are described with respect to user interface 600.

Device field 605 may include information associated with one or more STBs 120 that user device 110 detects on network 150. Information associated with STB 120 may include a device identifier (e.g., a device name, an encoder/decoder (CODEC) identifier, an electronic serial number, etc.), a network address (e.g., an Internet protocol (IP) address, a media access control (MAC) address, etc.), an indication whether STB 120 is connected to network 150, etc. Connect button 610 may, when selected by the user, cause user device 110 to establish a connection with a particular STB 120, identified in device field 605, that is selected by the user, which may enable a session to be started with the selected STB 120.

Disconnect button 615 may, when selected by the user, cause user device 110 to disconnect from STB 120 that the user has selected within device field 605, which may cause a session with STB 120 to end. Delete button 620 may, when selected by the user, cause user device 110 to delete information associated with STB 120 that the user has selected within device field 605. Add device button 625 may, when selected by the user, allow a user to enter information, via modification field 635, associated with STB 120 to be added. Adding the information, associated with STB 120, may allow user device 110 to automatically discover the added STB 120 to identify whether the added STB 120 is connected to network 120. Device info button 630 may, when selected by the user, cause information, associated with STB 120 and which is selected within device field 605, to be displayed via modification field 635. Displaying the information associated with the selected STB 120 may permit the user to modify the information associated with the selected STB 120 (e.g., by changing a device name, identifier, network address, etc.).

Save button 640 may, when selected by the user, cause user device 110 to save information associated with an added STB 120 and/or information, associated with a STB 120, that was modified by the user. Exit button 645 may, when selected by the user, cause user interface 600 to close.

User device 110 may receive, via user interface 600, an instruction to establish a connection with STB 120 when the user selects information associated with STB 120 within device field 605 and selects connect button 610. User device 110 may communicate with STB 120 to establish the connection with STB 120 in response to the request. User device 110 may determine, as a result of establishing the connection, that STB 120 is executing a widget.

As also shown in FIG. 5, process 500 may include retrieving a resource profile associated with the set top box (block 515) and obtaining, from the set top box, a usage profile associated with a widget being executed by the set top box (block 520). For example, user device 110 may retrieve, from a memory associated with user device 110, a resource profile, associated with STB 120, that was set up by the user in a manner similar to that described above with respect to FIG. 3.

Additionally, or alternatively, user device 110 may obtain, from STB 120, information associated with the widget being executed by STB 120 and/or information associated with a usage profile for the widget. The information associated with the widget may include information that uniquely identifies the widget (e.g., a widget name, an application identifier, a digital signature, etc.), information associated with a creator of the widget (e.g., a programmer name, a vendor name or identifier, etc.), and/or information associated with a version of the widget (e.g., a version identifier, a date associated with the widget, etc.). The information associated with the usage profile may identify resources used by the widget to allow the widget to perform properly when being executed. In one example, the usage profile may be predetermined (e.g., by the creator, based on prior sessions, etc.) and/or provided as part of the information associated with the widget. In another example, the usage profile may be provided, by STB 120, based on actual resources used by the widget when STB 120 is executing the widget.

As further shown in FIG. 5, process 500 may include identifying resource thresholds for the widget based on the resource profile and the usage profile (block 525) and transmitting, to the set top box, a resource usage configuration based on the identified resource thresholds (block 530). For example, user device 110 may generate a resource usage configuration, for STB 120, based on the information associated with the usage profile obtained from STB 120 and the resource profile obtained from the memory associated with user device 110. User device 110 may establish a maximum allocation, for each resource, associated with STB 120, that is to be made available to the widget, when STB 120 is executing the widget. The maximum allocation may be based on a lesser of a resource setting identified by the resource profile or a resource to be used by the widget as identified by the usage profile. For example, if a memory resource setting, identified by the resource profile, identifies a first quantity of memory to be allocated to a widget, and the usage profile identifies a second quantity of memory to be used by the widget, then user device 110 may identify a maximum memory resource allocation based on a lesser of the first quantity of memory or the second quantity of memory.

User device 110 may, in a manner similar to that described above, identify maximum allocations for other resources (e.g., network resources, graphics resources, bitmap resources, time resources, processing resources, etc.) based on the lesser of resources specified by the resource profile or identified by the usage profile. User device 110 may transmit, to STB 120, a resource usage configuration based on the maximum allocations of the resources identified by user device 110. STB 120 may receive the resource usage configuration and may establish thresholds, based on the maximum resource allocations identified by the resource usage configuration, to govern the quantity of resources to be made available to the widget.

As yet further shown in FIG. 5, process 500 may include receiving, from the set top box, usage information associated with the widget (block 535) and generating a report based on the usage information or the usage profile (block 540). For example, user device 110 may communicate with STB 120 to obtain usage information for the session associated with STB 120. The usage information may identify actual quantities of resources used by the widget while being executed by STB 120.

In one example, user device 110 may generate a report that identifies resources, associated with STB 120, that were used by the widget during the session. The report may identify quantities of memory resources used, network resources used, graphics resources used, bitmap resources used, time resources used, processing resources used, etc. Contents of an example report will be described in greater detail below with respect to FIG. 7.

If a condition, associated with the widget, is detected (block 545-YES), then process 500 may include generating a notification that the widget does not conform to the resource usage configuration (block 550). For example, user device 110 may compare the actual quantities of resources used by the widget, obtained from the usage information, with maximum resource allocations, identified by the resource usage configuration, to determine whether a condition is associated with the widget.

User device 110 may, for example, compare a quantity of memory used by the widget (e.g., a quantity of memory blocks, a size of memory used, etc.), while executing on STB 120, to a maximum memory resource allocation. User device 110 may determine that a condition is associated with the widget when the quantity of memory used by the widget is greater than the maximum memory resource allocation identified by the resource usage configuration. In another example, the usage information may include an indication that STB 120 denied use of a portion of the memory (e.g., associated with STB 120) when the quantity of memory, used by the widget, reached the maximum memory allocation. User device 110 may, in this example, determine that a condition is associated with the widget when the usage information includes the indication that STB 120 denied use of the portion of the memory.

Additionally, or alternatively, user device 110 may compare other quantities of resources used (e.g., quantities associated with network resources, graphics, bitmaps, time, processing capacity, etc.) with maximum resource allocations to determine whether a condition is associated with the widget. User device 110 may determine that a condition is associated with the widget when any of the other quantities of resources used, by the widget, is greater than respective maximum resource allocations identified by the resource usage configuration.

Additionally, or alternatively, user device 110 may determine that a condition is associated with the widget when any of quantities of resources, that are expected to be used by the widget (e.g., obtained from the usage profile received from STB 120), is greater than respective maximum resource allocations identified by the resource usage configuration.

Based on a determination that a condition is associated with the widget, user device 110 may generate a notification that indicates that the widget does not conform to the resource usage configuration associated with STB 120. The notification that the widget does not conform to the resource usage configuration may allow a programmer and/or vendor, associated with the widget, to modify the widget in a manner that allows the widget to run properly when being executed by STB 120 and/or when using resources in a manner that conforms to the resource usage configuration.

If a condition, associated with the widget, is not detected (block 545-NO), then process 500 may include generating a notification that the widget conforms to the resource usage configuration (block 550). For example, user device 110 may determine that a condition is not associated with the widget when the quantity of memory, used by the widget, is not greater than the maximum memory resource allocation identified by the resource usage configuration. In another example, the usage information may not include the indication that STB 120 denied use of a portion of the memory (e.g., associated with STB 120) when the quantity of memory, used by the widget, did not reach the maximum memory allocation. User device 110 may, in this example, determine that a condition is not associated with the widget when the usage information does not include the indication that STB 120 denied use of the portion of the memory.

Additionally, or alternatively, user device 110 may determine that a condition is not associated with the widget when none of the other quantities of resources used, by the widget, is greater than respective maximum resource allocations identified by the resource usage configuration. Additionally, or alternatively, user device 110 may determine that a condition is not associated with the widget when none of the quantities of resources, that were expected to be used by the widget (e.g., obtained from the usage profile received from STB 120), is greater than the respective maximum resource allocations identified by the resource usage configuration.

Based on the determination that a condition is not associated with the widget, user device 110 may generate a notification that indicates that the widget conforms to the resource usage configuration associated with STB 120. Additionally, or alternatively, user device 110 may include, within the notification, an indication that the widget has been certified as a conforming widget which may allow the widget to be offered to other STBs 120 via application server 140.

Figure 7:
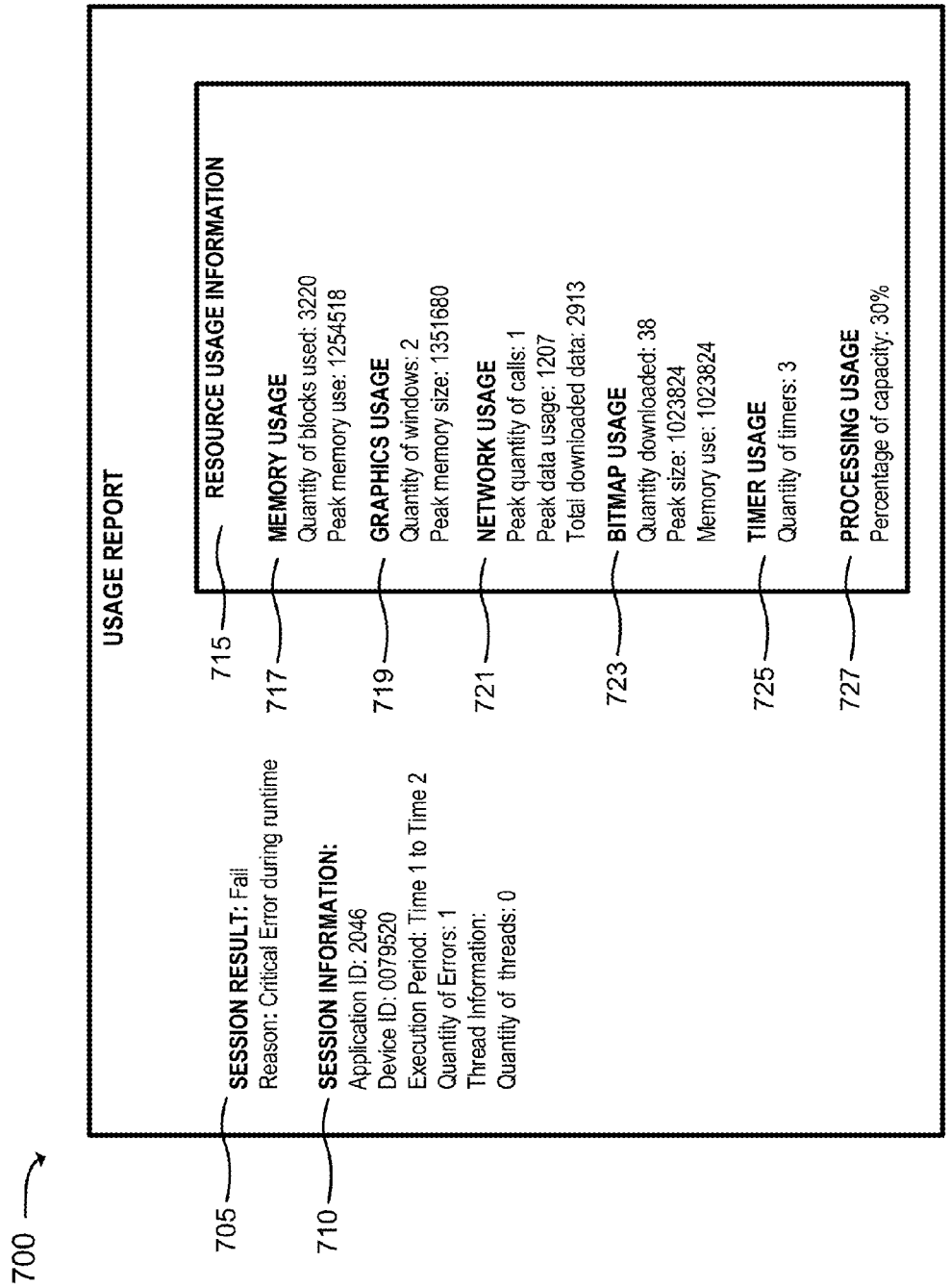
FIG. 7 is a diagram of an example report that identifies usage information of a widget being executed by a set top box during a session, according to an implementation described herein.

FIG. 7 is a diagram of an example report 700 that identifies usage info associated with a widget being executed by STB 120 during a session, according to an implementation described herein. As shown in FIG. 7, report 700 may include a session result data item 705, a session information data item 710, and a resource usage information data item 715. Report 700 includes a quantity of data items for explanatory purposes. In another implementation, report 700 may include additional data items, fewer data items, different data items, and/or differently arranged data items than are described with respect to report 700.

Session result data item 705 may identify whether a widget, executed by STB 120, conforms to a resource usage configuration associated with STB 120. For example, when user device 110 determines that the widget does not conform to the resource usage configuration, user device 110 may include, in session result data item 705, an indication that the widget does not conform (e.g., shown as "Fail") to the resource usage configuration. Alternatively, when user device 110 determines that the widget conforms to the resource usage configuration, user device 110 may include, in session result data item 705, another indication that the widget conforms (e.g., pass) to the resource usage configuration. Session result data item 705 may also, or alternatively, include a reason for a session result (e.g., critical error during runtime), which may be caused due to non-conforming resource usage by the widget.

Session information data item 710 may include information associated with the session, such as information associated with the widget (e.g., application ID: 2046), information associated with STB 120 (e.g., device ID: 0079520), an execution period during which the session occurred (e.g., Time 1 to Time 2), a quantity of errors associated with the session (e.g., 1), information associated with a quantity of threads and/or processes performed during the session (e.g., 0).

Resource usage information data item 715 may identify the resources used, by the widget, when executed by STB 120 during the session. Resource usage information data item 715 may include memory usage data item 717, graphics usage data item 719, network usage data item 721, bitmap usage data item 723, timer usage data item 725, and processing usage data item 727. Memory usage data item 717 may identify a quantity of memory used (e.g., quantity of blocks: 3220, peak memory use: 1254518, etc.), by the widget, when being executed by STB 120.

Graphics usage data item 719 may identify a quantity of graphics used (e.g., quantity of windows: 2, peak graphics memory used: 1351680, etc.), by the widget, when being executed by STB 120. Network usage data item 721 may identify a quantity of network resources used (e.g., peak quantity of calls: 1, peak data usage: 1207, total downloaded data: 2913, etc.), by the widget, when being executed by STB 120. Bitmap usage data item 723 may identify a quantity of bitmap resources used (e.g., quantity downloaded: 38, peak size: 1023824, total bitmap memory used: 1023824, etc.), by the widget, when being executed by STB 120. Timer usage data item 725 may identify a quantity of timer resources used (e.g., quantity of timers: 3, etc.), by the widget, when being executed by STB 120. Processing usage data item 727 may identify a quantity of processing resources used (e.g., percentage of capacity at peak: 30%, etc.), by the widget, when being executed by STB 120.

FIGS. 8A and 8B are diagrams of example user interface 800 and user interface 850 that allow the user, of user device 110, to request or view usage reports pertaining to a session associated with STB 120, according to an implementation described herein. User interface 800 may allow a user to generate a report for one or more sessions associated with STB 120 and/or emulation server 130. User interface 800 may be provided, by user device 110, when the user selects a particular button 415 (e.g., report button 415 or some other button) on user interface 400 (FIG. 4). As shown in FIG. 8A, user interface 800 may include a collection of fields and/or buttons, such as a select device field 805, a select application field 810, a select session field 815, a generate report button 820, a view report button 825, and/or an exit button field 830.

Select device field 805 may allow a user to select a device (e.g., STB 120 and/or emulation server 130), from a list of devices (e.g., included in a pull-down menu that is opened when the user selects a button associated with a downward pointing symbol "▼,"), associated with a session for which a report is to be generated. Select application field 810 may allow the user to select a particular widget (e.g., from a list of widgets included in a pull down menu) that was executed by the selected STB 120 and/or emulation server 130 during a session. Select session field 815 may allow the user to select a particular session (e.g., from a list of sessions included in a pull down menu) that was performed by the selected STB 120 and/or emulation server 130 during a prior period of time.

Generate report button 820 may, when selected by the user, cause user device 110 to retrieve, from a memory associated with user device 110, usage information associated with the selected session, selected STB 120 and/or emulation server 130, and/or selected widget. Additionally, or alternatively, user device 110 may retrieve, from the memory, information associated with a resource usage configuration associated with the selected STB 120 and/or emulation server 130 and/or a usage profile associated with the selected widget. View report button 825 may, when selected by the user, cause user device 110 to generate a report (e.g., such as report 700 of FIG. 7). Exit button field 830 may, when selected by the user, cause user interface 800 to close.

User interface 850, of FIG. 8B, may allow a user, of user device 110, to generate a cumulative report for one or more previous sessions associated with STBs 120 on which widgets have been executed. User interface 850 may be provided, by user device 110, when the user selects a particular button 415 (e.g., report button 415 or some other button) on user interface 400 (FIG. 4). As shown in FIG. 8B, user interface 850 may include a collection of fields and/or buttons, such as a total sessions field 855, a sessions passed field 860, a sessions failed field 865, a sessions active field 870, a choose option field 880, a device field 885, a view button 890, and an exit button field 895. Total sessions field 855 may identify a quantity of sessions performed by one or more STBs 120 and/or emulation servers 130 connected to network 150.

Sessions passed field 860 may identify a quantity of the sessions for which widgets conformed to resource usage configurations associated with the STBs 120 and/or emulation servers 130 connected to network 150. Sessions failed field 865 may identify a quantity of the sessions for which widgets did not conform to resource usage configurations associated with the STBs 120 and/or emulation servers 130 connected to network 150.

Sessions active field 870 may identify a quantity of the sessions for which widgets are currently being executed by one or more STBs 120 and/or emulations servers 130 connected to network 150. Choose option field 880 may permit the user to select one or more sessions to be included in a cumulative report (e.g., total sessions, passed sessions, failed sessions, active sessions, etc.). Additionally, or alternatively, choose option field 880 may permit the user to select usage information, associated with a selected profile, to be included in the cumulative report that allows the user to compare the usage information, associated with the chosen sessions, with usage information associated with the selected profile.

Device field 885 may include information associated with sessions performed by the one or more STBs 120 and/or emulation servers 130 connected to network 150. The information associated with a session may include a session identifier (e.g., a session name, a session ID, a date on which the session was performed, etc.), information associated with a widget that was executed during the session (e.g., a widget name, a widget identifier, a digital signature, etc.), an indication of whether the session is active or not active, and/or information associated with STB 120 and/or emulation server 130 that performed the session, such as a device identifier (e.g., a CODEC identifier, a electronic serial number, etc.), a network address (e.g., an IP address, a MAC address, etc.). View button 890, when selected by the user, may cause user device 110 to retrieve usage information associated with the sessions and/or resource usage configurations associated with the one or more STBs 120 and/or emulation servers 130 and to generate the cumulative report, for display on user device 110, based on the retrieved usage information and/or the resource usage configurations. Exit button field 895 may cause user interface 850 to close.

User interface 800, of FIG. 8A, and/or user interface 850, of FIG. 8B, may include a quantity of fields and/or buttons for explanatory purposes. In another implementation, user interface 800 and/or user interface 850 may include additional fields and/or buttons, fewer fields and/or buttons, different fields and/or buttons, and/or differently arranged fields and/or buttons than are described with respect to user interface 800 and/or user interface 850.

A system and/or method, described herein, may allow a user device to monitor and/or control resource usage, associated with a set top box, while the set top box is executing a widget. The system and/or method may allow a user, of the user device, to set up a resource profile, associated with the set top box, that identifies a manner in which resources, associated with the set top box, are to be allocated when the set top box operates and/or executes one or more widgets.

The system and/or method may allow the user device to obtain, from the set top box, a usage profile, associated with the widget, that identifies resources that are expected to be used, by the widget, when the widget is being executed by the set top box. The system and/or method may allow the user device to generate a resource usage configuration, associated with the set top box, that allocates resources, for executing the widget, based on the resource profile and/or the usage profile. The system and/or method may allow the user device to identify whether a condition, is associated with the widget, based on whether a manner in which resources used by the widget, when being executed by the set top box, conform to the resource usage configuration associated with the set top box. The system and/or method may allow a widget to be developed and/or modified to conform to the usage resource configuration associated with a set top box.

The foregoing description provides illustration and description, but is not intended to be exhaustive or to limit the implementations to the precise form disclosed. Modifications and variations are possible in light of the above teachings or may be acquired from practice of the implementations.

While series of blocks have been described with regard to FIGS. 3 and 5, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Further, certain portions, described above, may be implemented as a component or logic that performs one or more functions. A component or logic, as used herein, may include hardware, such as a processor, an application-specific integrated circuit (ASIC), or a field-programmable gate array (FPGA), or a combination of hardware and software (e.g., a processor executing software).

It should be emphasized that the term "comprises/comprising," when used in this specification, is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
  receiving, by a user device, a request to establish a session with a set top box that is executing an application;
  obtaining, by the user device and in response to the request, a resource profile, associated with the set top box, that identifies usage patterns of resources associated with the set top box;
  obtaining, from the set top box, a usage profile, associated with the application, that identifies a first quantity of the resources expected to be used, by the application, during the session;
  creating, by the user device, a resource configuration, associated with the set top box, that identifies a second quantity of the resources to be allocated for executing the application based on the resource profile and the usage profile;
  receiving, from the set top box, usage information that identifies a third quantity of the resources that have been used by the application during the session;
  transmitting, by the user device, a first notification that a first condition is associated with the application when the third quantity of the resources is greater than the second quantity of the resources; and
  transmitting, by the user device, a second notification that a second condition is associated with the application when the first quantity of the resources is greater than the second quantity of the resources.

2. The method of claim 1, wherein the resources associated with the set top box correspond to at least two of:
  graphics resources that identify a quantity of graphics windows that are permitted by the set top box,
  network resources that identify a quantity of network activity that is permitted by the set top box,
  bitmap resources that identify a quantity of bitmaps that are permitted to be downloaded to the set top box, or
  timer resources that identify a quantity of available processing time associated with the set top box.

3. The method of claim 2, wherein creating the resource configuration, associated with the set top box, further includes at least two of:
  identifying a first threshold, associated with the timer resources, that identifies a portion of the timer resources that are to be allocated, to the application, when the set top box executes the application;
  identifying a second threshold, associated with the graphics resources, that identifies a portion of the graphics resources that is to be allocated, to the application, when the set top box executes the application;
  identifying a third threshold, associated with the network resources, that identifies a portion of the network resources that is to be allocated, to the application, when the set top box executes the application; or
  identifying a fourth threshold, associated with the bitmap resources, that identifies a portion of the bitmap resources that is to be allocated, to the application, when the set top box executes the application.

4. The method of claim 1, wherein the resources associated with the set top box correspond to memory resources that identify a quantity of available memory associated with the set top box, and creating the resource configuration further includes:
  obtaining, from the usage profile, a first quantity of memory to be used by the application;
  obtaining, from the resource profile, a second quantity of memory, associated with the set top box, that can be used, by the set top box, to execute one or more applications; and
  identifying a threshold based on a lesser of the first quantity of memory or the second quantity of memory, wherein the threshold identifies a portion of the memory resources that is to be allocated, to the application, when the set top box executes the application.

5. The method of claim 1, wherein the resources associated with the set top box correspond to memory resources that identify a quantity of available memory associated with the set top box, the method further comprising:
  obtaining, from the usage profile, a first quantity or amount of memory to be used by the application;
  obtaining, from the resource profile, a second quantity or amount of memory, associated with the set top box, that can be used, by the set top box, to execute one or more applications; and
  determining that the second condition is associated with the application when the first quantity or amount of memory is greater than the second quantity or amount of memory.

6. The method of claim 1, further comprising:
  receiving a request to set up the resource profile;
  providing a user interface that allows a user, of the user device, to enter information associated with the resource profile,
    where the information associated with the resource profile identifies the resources that the set top box is permitted to use to execute one or more applications;
  receiving, via the user interface, the information associated with the resource profile; and
  creating the resource profile based on the information associated with the resource profile.

7. The method of claim 1, further comprising:
  communicating, with the set top box, to establish a connection with the set top box as a result of receiving the request to establish the session.

8. The method of claim 1, further comprising:
  receiving a request to establish another session with another set top box that is emulated on a server device;

establishing a connection with the server device that allows the other session to be established with the other set top box,
  where establishing the other session allows the server device to emulate the other set top box executing another application.

9. The method of claim 8, where emulating the other application, being executed by the other set top box, allows a developer, of the other application, to cause the other application to use a quantity of resources that is less than available resources identified by a resource configuration associated with the other set top box.

10. A user device comprising:
  one or more memories storing instructions; and
  one or more processors to execute the instructions to:
    receive a request to establish a session with a set top box for executing an application;
    obtain, in response to the request, a resource profile, associated with the set top box, that identifies usage patterns of resources associated with the set top box;
    obtain, from the set top box, a usage profile associated with the application, identifying a first quantity of the resources expected to be used for executing the application during the session;
    create, based on the resource profile and the usage profile a resource configuration, associated with the set top box, identifying a second quantity of the resources to be allocated for executing the application;
    receive, from the set top box, usage information identifying a third quantity of the resources that have been used by the application during the session;
    transmit, when the third quantity of the resources is greater than the second quantity of the resources, a first notification that a first condition is associated with the application; and
    transmit, when the first quantity of the resources is greater than the second quantity of the resources, a second notification that a second condition is associated with the application.

11. The user device of claim 10, wherein the resources associated with the set top box correspond to at least one of:
  graphics resources identifying a quantity of graphics windows that are permitted by the set top box,
  bitmap resources identifying a quantity of bitmaps that are permitted to be downloaded to the set top box, or
  timer resources identifying a quantity of available processing time associated with the set top box.

12. The user device of claim 11, wherein, when creating the resource configuration, associated with the set top box, the one or more processors further execute the instructions to:
  identify a first threshold, associated with the timer resources, that identifies a portion of the timer resources that are to be allocated, to the application, when the set top box executes the application;
  identify a second threshold, associated with the graphics resources, that identifies a portion of the graphics resources that is to be allocated, to the application, when the set top box executes the application; or
  identify a third threshold, associated with the bitmap resources, that identifies a portion of the bitmap resources that is to be allocated, to the application, when the set top box executes the application.

13. The user device of claim 10, wherein the resources associated with the set top box correspond to memory resources identifying a quantity of available memory associated with the set top box, and when creating the resource configuration, associated with the set top box, the one or more processors further execute the instructions to:
  obtain, from the usage profile, a first quantity of memory to be used by the application;
  obtain, from the resource profile, a second quantity of memory, associated with the set top box, that can be used, by the set top box, to execute one or more applications; and
  identify a threshold based on a lesser of the first quantity of memory or the second quantity of memory, wherein the threshold identifies a portion of the memory resources that is to be allocated, to the application, when the set top box executes the application.

14. The user device of claim 10, wherein the resources associated with the set top box correspond to memory resources that identify a quantity of available memory associated with the set top box, and the one or more processors further execute the instructions to:
  obtain, from the usage profile, a first quantity or amount of memory to be used by the application;
  obtain, from the resource profile, a second quantity or amount of memory, associated with the set top box, that can be used, by the set top box, to execute one or more applications; and
  determine that the second condition is associated with the application when the first quantity or amount of memory is greater than the second quantity or amount of memory.

15. The user device of claim 10, the one or more processors to further execute the instructions to:
  receive a request to set up the resource profile;
  provide a user interface that allows a user, of the user device, to enter information associated with the resource profile,
    wherein the information associated with the resource profile identifies the resources that the set top box is permitted to use to execute one or more applications;
  receive, via the user interface, the information associated with the resource profile; and
  create the resource profile based on the information associated with the resource profile.

16. The user device of claim 10, the one or more processors further execute the instructions to:
  communicate, with the set top box, to establish a connection with the set top box as a result of receiving the request to establish the session.

17. A non-transitory computer-readable storage medium, comprising computer-executable instructions for causing one or more processors executing the computer-executable instructions to:
  receive a request to establish a session with a set top box for executing an application;
  obtain, in response to the request, a resource profile, associated with the set top box, that identifies usage patterns of resources associated with the set top box;
  obtain, from the set top box, a usage profile associated with the application, identifying a first quantity of the resources expected to be used for executing the application during the session;
  create, based on the resource profile and the usage profile, a resource configuration, associated with the set top box, identifying a second quantity of the resources to be allocated for executing the application;
  receive, from the set top box, usage information identifying a third quantity of the resources that have been used by the application during the session;

transmit, when the third quantity of the resources is greater than the second quantity of the resources, a first notification that a first condition is associated with the application; and transmit, when the first quantity of the resources is greater than the second quantity of the resources, a second notification that a second condition is associated with the application.

18. The non-transitory computer-readable storage medium of claim 17, wherein the resources associated with the set top box correspond to at least one of:

graphics resources identifying a quantity of graphics windows that are permitted by the set top box, bitmap resources identifying a quantity of bitmaps that are permitted to be downloaded to the set top box, or timer resources identifying a quantity of available processing time associated with the set top box.

19. The non-transitory computer-readable storage medium of claim 18, wherein, when creating the resource configuration, associated with the set top box, the one or more processors further execute the computer-executable instructions to:

identify a first threshold, associated with the timer resources, that identifies a portion of the timer resources that are to be allocated, to the application, when the set top box executes the application;

identify a second threshold, associated with the graphics resources, that identifies a portion of the graphics resources that is to be allocated, to the application, when the set top box executes the application; or identify a third threshold, associated with the bitmap resources, that identifies a portion of the bitmap resources that is to be allocated, to the application, when the set top box executes the application.

20. The non-transitory computer-readable storage medium of claim 17, wherein the resources associated with the set top box correspond to memory resources identifying a quantity of available memory associated with the set top box, and when creating the resource configuration, associated with the set top box, the one or more processors execute the computer-executable instructions further to:

obtain, from the usage profile, a first quantity of memory to be used by the application;

obtain, from the resource profile, a second quantity of memory, associated with the set top box, that can be used, by the set top box, to execute one or more applications; and identify a threshold based on a lesser of the first quantity of memory or the second quantity of memory, wherein the threshold identifies a portion of the memory resources that is to be allocated, to the application, when the set top box executes the application.

21. The non-transitory computer-readable storage medium of claim 17, wherein the resources associated with the set top box correspond to memory resources that identify a quantity of available memory associated with the set top box, and the one or more processors further execute the computer-executable instructions to:

obtain, from the usage profile, a first quantity or amount of memory to be used by the application;

obtain, from the resource profile, a second quantity or amount of memory, associated with the set top box, that can be used, by the set top box, to execute one or more applications; and determine that the second condition is associated with the application when the first quantity or amount of memory is greater than the second quantity or amount of memory.

22. The non-transitory computer-readable storage medium of claim 17, the one or more processors to further execute the computer-executable instructions to:

receive a request to set up the resource profile;

provide a user interface that allows a user, of the user device, to enter information associated with the resource profile, wherein the information associated with the resource profile identifies the resources that the set top box is permitted to use to execute one or more applications;

receive, via the user interface, the information associated with the resource profile; and create the resource profile based on the information associated with the resource profile.

23. The non-transitory computer-readable storage medium of claim 17, the one or more processors further execute the computer-executable instructions to:

communicate, with the set top box, to establish a connection with the set top box as a result of receiving the request to establish the session.

* * * * *